United States Patent
Masse et al.

(10) Patent No.: US 12,399,372 B1
(45) Date of Patent: Aug. 26, 2025

(54) SUPPORT BAND FOR WEARABLE ELECTRONIC DEVICE

(71) Applicants: Zebinah P. Masse, Mountain View, CA (US); Benjamin A. Stevenson, Oakland, CA (US); Ryan M. David, Escondido, CA (US); Evan A. Cernokus, Campbell, CA (US); Timon A. Wright, San Francisco, CA (US); Heidi Williamson, San Francisco, CA (US)

(72) Inventors: Zebinah P. Masse, Mountain View, CA (US); Benjamin A. Stevenson, Oakland, CA (US); Ryan M. David, Escondido, CA (US); Evan A. Cernokus, Campbell, CA (US); Timon A. Wright, San Francisco, CA (US); Heidi Williamson, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 764 days.

(21) Appl. No.: 17/236,012

(22) Filed: Apr. 21, 2021

Related U.S. Application Data

(60) Provisional application No. 63/038,166, filed on Jun. 12, 2020.

(51) Int. Cl.
*G02B 27/01* (2006.01)
*G06F 1/16* (2006.01)

(52) U.S. Cl.
CPC ......... *G02B 27/0176* (2013.01); *G06F 1/163* (2013.01)

(58) Field of Classification Search
CPC .............................. G02B 27/0176; G06F 1/163
See application file for complete search history.

(56) References Cited

U.S. PATENT DOCUMENTS

| | | | |
|---|---|---|---|
| 5,642,221 A | 6/1997 | Fischer et al. | |
| 5,767,820 A | 6/1998 | Bassett et al. | |

(Continued)

FOREIGN PATENT DOCUMENTS

| | | |
|---|---|---|
| CN | 206489325 U | 9/2017 |
| CN | 104793338 B | 8/2018 |

(Continued)

OTHER PUBLICATIONS

IFIXIT, "Oculus Rift CV1 Teardown", Published Mar. 30, 2016, https://www.ifixit.com/Teardown/Oculus+Rift+CV1+Teardown/60612#s126787 (14 pp).

(Continued)

*Primary Examiner* — Matthew A Eason
*Assistant Examiner* — Chayce R Bibbee
(74) *Attorney, Agent, or Firm* — Young Basile Hanlon & MacFarlane, P.C.

(57) ABSTRACT

A support band for a wearable electronic device includes a first band portion, a second band portion, and an adjustment assembly. A cable is connected to the second band portion extends through a first passage and a second passage of a cable lock that is connected to the first band portion. The locking features allow movement of the cable in a tightening direction and restrain movement of the cable in a loosening direction. A cable pull engages a first portion of the cable between the first passage and the second passage. The cable pull moves away from the cable lock during an extension stroke, and the cable pull moves toward the cable lock during a return stroke.

24 Claims, 10 Drawing Sheets

(56) References Cited

U.S. PATENT DOCUMENTS

| | | | |
|---|---|---|---|
| 5,844,656 | A | 12/1998 | Ronzani et al. |
| 6,448,944 | B2 | 9/2002 | Ronzani et al. |
| 8,040,292 | B2 | 10/2011 | Ronzani et al. |
| 8,545,013 | B2 | 10/2013 | Hwang et al. |
| 9,927,618 | B2 | 3/2018 | Allin et al. |
| D829,208 | S | 9/2018 | Dallmeyer et al. |
| 10,408,313 | B1 | 9/2019 | Sullivan et al. |
| 10,509,438 | B1 | 12/2019 | Magrath |
| D874,459 | S | 2/2020 | Limaye et al. |
| 12,196,972 | B1 | 1/2025 | Williamson et al. |
| 2009/0091838 | A1 | 4/2009 | Zaloum et al. |
| 2009/0128450 | A1* | 5/2009 | Nakabayashi ..... G02B 27/0176 345/8 |
| 2010/0327028 | A1* | 12/2010 | Nakabayashi ..... G02B 27/0176 224/181 |
| 2015/0185764 | A1 | 7/2015 | Magi |
| 2015/0219901 | A1 | 8/2015 | Morimoto |
| 2016/0054570 | A1 | 2/2016 | Bosveld et al. |
| 2016/0062125 | A1 | 3/2016 | Baek et al. |
| 2016/0216512 | A1 | 7/2016 | Miller et al. |
| 2016/0286163 | A1 | 9/2016 | Edwards |
| 2017/0017085 | A1 | 1/2017 | Araki et al. |
| 2017/0227793 | A1 | 8/2017 | Abreu |
| 2018/0055202 | A1 | 3/2018 | Miller et al. |
| 2018/0256942 | A1* | 9/2018 | Love ................. G02B 27/0172 |
| 2018/0295733 | A1 | 10/2018 | Wen et al. |
| 2019/0141847 | A1 | 5/2019 | Chang et al. |
| 2019/0204606 | A1 | 7/2019 | Yang et al. |
| 2019/0220056 | A1 | 7/2019 | Yan |
| 2019/0243145 | A1 | 8/2019 | Ellis et al. |
| 2019/0346682 | A1 | 11/2019 | Kang et al. |
| 2020/0008533 | A1* | 1/2020 | Hammerslag ........ A43C 11/165 |
| 2020/0170327 | A1 | 6/2020 | Yee |
| 2022/0187609 | A1* | 6/2022 | Snyder ................. H04R 1/1066 |

FOREIGN PATENT DOCUMENTS

| | | |
|---|---|---|
| CN | 105661735 B | 6/2019 |
| EP | 2229880 A1 | 9/2010 |
| WO | 2017113487 A1 | 7/2017 |
| WO | 2018124344 A1 | 7/2018 |
| WO | 2020038004 A1 | 2/2020 |

OTHER PUBLICATIONS

IFIXIT, "PlayStation VR Teardown", Published Oct. 13, 2016, https://www.ifixit.com/Teardown/PlayStation+VR+Teardown/69341 (16 pp).

Griplock Systems, "Cable Suspension Systems, ZF-30X2", https://www.griplocksystems.com/product/zf-30x2, Downloaded Apr. 20, 2020 (3 pp).

* cited by examiner

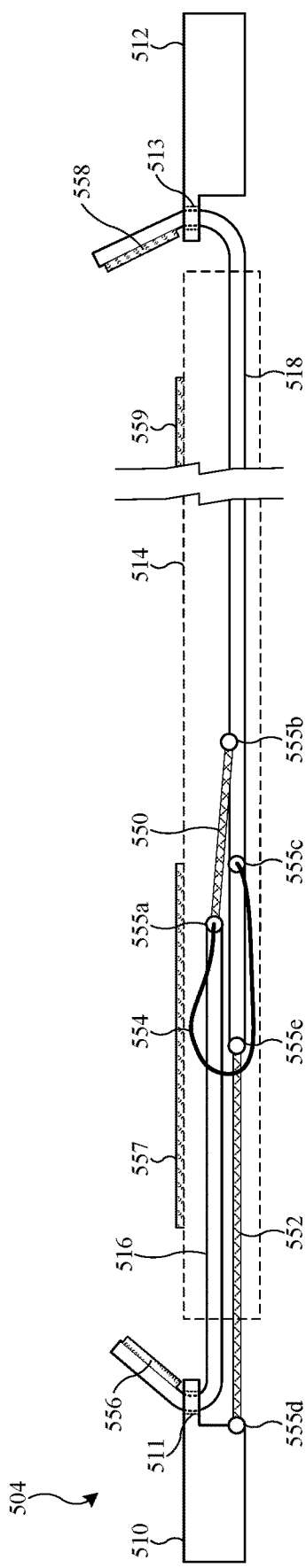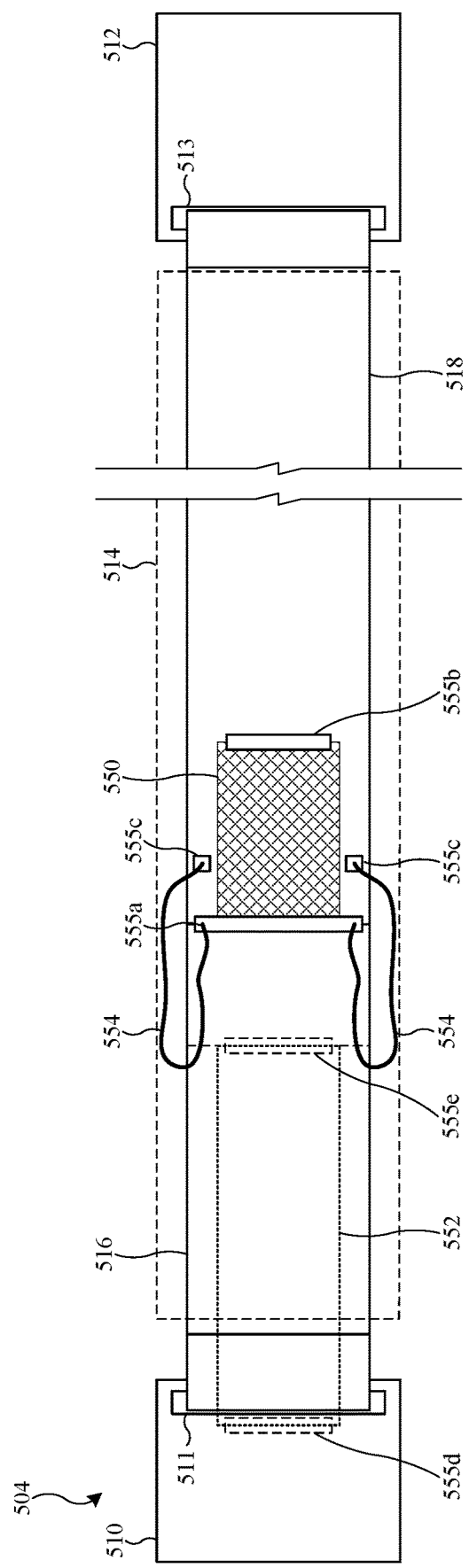

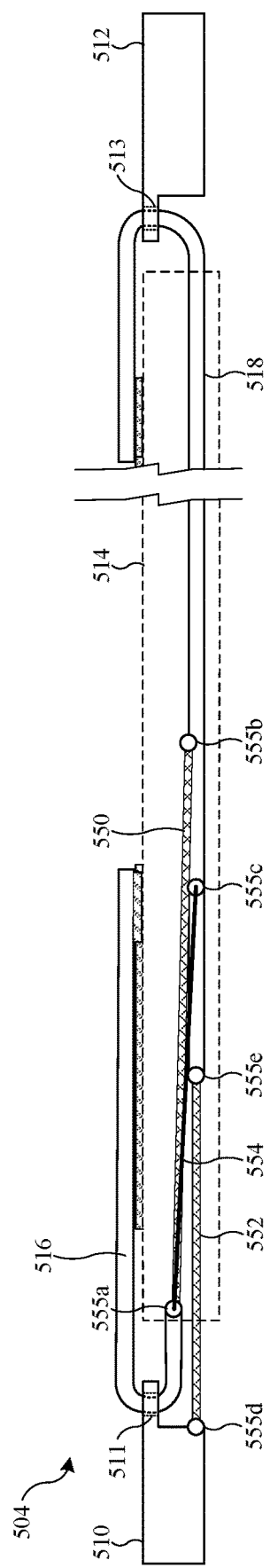

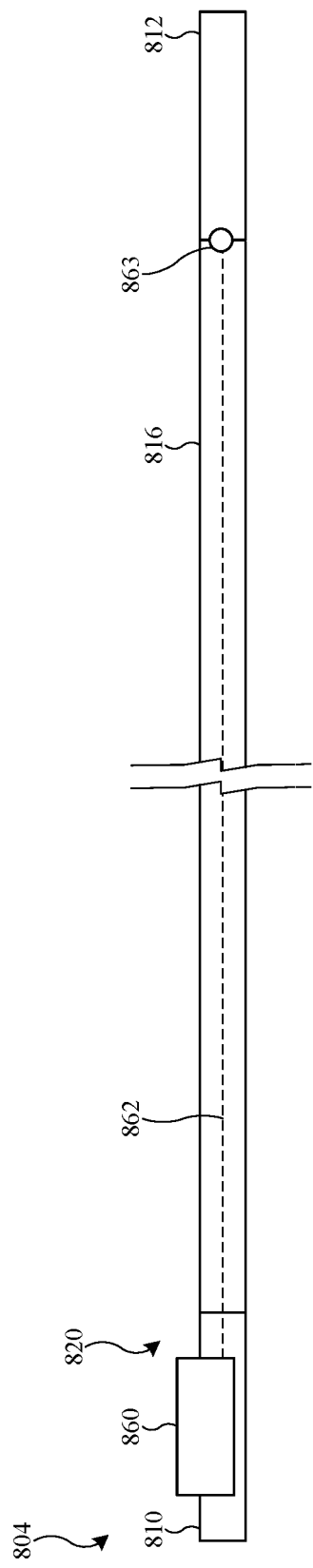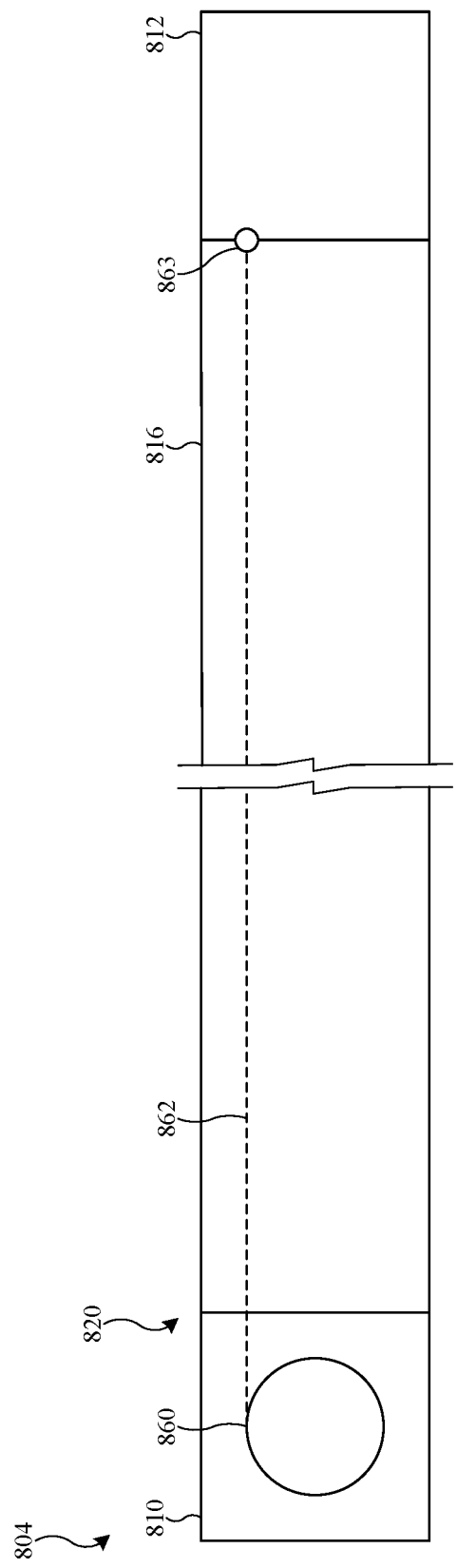

SUPPORT BAND FOR WEARABLE ELECTRONIC DEVICE

CROSS-REFERENCE TO RELATED APPLICATIONS

This application claims the benefit of U.S. Provisional Application No. 63/038,166, filed on Jun. 12, 2020, the content of which is hereby incorporated by reference in its entirety for all purposes.

FIELD

The present disclosure relates generally to the field of wearable electronic devices.

BACKGROUND

Some electronic devices are configured so that they can be worn by a user. One example of a wearable electronic device is a smart watch. Another example of a wearable electronic device is a head-mounted display device that is configured to show computer-generated content to the user. These devices may include, for example, computing components, display components, and support components. The computing components and the display components may be used to show information and other content to a user. The support components hold the electronic device in a consistent position with respect to the user's body.

SUMMARY

A support band for a wearable electronic device includes a first band portion, a second band portion, and an adjustment assembly that is operable to adjust a distance between the first band portion and the second band portion. The adjustment assembly includes a cable that is connected to the second band portion, a cable lock that is connected to the first band portion, and a cable pull. The cable lock includes a first passage, a second passage, and locking features. The cable extends through the first passage and the second passage. A first portion of the cable extends out of the cable lock between the first passage and the second passage. The locking features are operable to allow movement of the cable with respect to the cable lock in a tightening direction. The locking features are operable to restrain movement of the cable with respect to the cable lock in a loosening direction. A cable pull engages the first portion of the cable and is movable with respect to the cable lock. The cable pull moves away from the cable lock during an extension stroke of the cable pull, and the cable pull moves toward the cable lock during a return stroke of the cable pull.

In some implementations, the cable moves through the first passage of the cable lock in the tightening direction during the extension stroke of the cable pull and the cable moves through the second passage of the cable lock in the tightening direction during the return stroke of the cable pull. The first portion of the cable may extend through a cable path that is defined by the cable pull. The cable pull may be slidingly connected to the first band portion. The first portion of the cable may include a u-shaped turn.

In some implementations, the cable lock includes a release mechanism that is operable to release engagement of the locking features with respect to the cable so that the cable is able to move in the loosening direction when the release mechanism is engaged.

In some implementations, the first band portion is flexible and the second band portion is flexible.

In some implementations, a guide structure is engageable with the cable between the first passage of the cable lock and the cable pull.

Another aspect of the disclosure is a support band for a wearable electronic device. The support band includes a first end portion, a second end portion, a first band portion, a second band portion, and a first elastic portion. The first band portion is adjustably connected to the first end portion and is movable between a connected position and a disconnected position with respect to the first end portion. The second band portion is adjustably connected to the second end portion. The first elastic portion is connected to the first end portion and is connected to the second band portion. The first band portion is connected to the second band portion to define a first load path that carries tension between the first end portion and the second end portion when the first band portion is in the connected position. The first elastic portion and the second band portion define a second load path that carries tension between the first end portion and the second end portion when the first band portion is in the disconnected position.

In some implementations, the second load path does not carry tension between the first end portion and the second end portion when the first band portion is in the connected position.

In some implementations, a second elastic portion is connected between the first band portion and the second band portion to draw the first band portion toward the second band portion when the first band portion is in the disconnected position.

In some implementations, a tension strap is connected between the first band portion and the second band portion to transmit tension between the first band portion and the second band portion when the first band portion is in the connected position.

In some implementations, the first band portion is flexible and inelastic, the second band portion is flexible and inelastic, the first elastic portion is flexible and elastic, the second elastic portion is flexible and elastic, and the tension strap is flexible and inelastic.

Another aspect of the disclosure is a support band for a wearable electronic device. The support band includes a first rigid portion, a second rigid portion, a flexible band portion that extends between the first rigid portion and the second rigid portion, an adjustment reel that is connected to the first rigid portion, and a cable that is connected to the adjustment reel, extends through the band portion from the adjustment reel to the second rigid portion, and is connected to the second rigid portion.

In some implementations, the adjustment reel is operable to change a length of the cable that extends between the adjustment reel and the second rigid portion.

In some implementations, the adjustment reel has an engaged position and a disengaged position, wherein the cable is movable in a tightening direction in the engaged position and in the disengaged position, the cable is restrained from moving in a loosening direction in the engaged position, and the cable is able to move in the loosening direction in the disengaged position. In some implementations, the band portion is elastic.

Another aspect of the disclosure is a support band for a wearable electronic device. The support band includes a first end portion, a second end portion, a band portion that is flexible and extends between the first end portion and the second end portion. A first adjustment reel is connected to the first end portion. A first cable is connected to the first adjustment reel, extends through the band portion, and is connected to the second end portion. A second adjustment reel is connected to the second end portion. A second cable is connected to the second adjustment reel, extends through the band portion, and is connected to the first end portion.

In some implementations, the band defines a first passage, the band defines a second passage, the first cable extends through the first passage of the band to constrain a lateral position of the first cable with respect to the band, and the second cable extends through the second passage of the band to constrain a lateral position of the second cable with respect to the band.

In some implementations, the first cable extends along a first longitudinal edge of the support band and the second cable extends along a second longitudinal edge of the support band.

BRIEF DESCRIPTION OF THE DRAWINGS

FIG. 5 is a side view illustration of a support band according to a second example in a disconnected position.

FIG. 6 is a top view illustration of the support band of FIG. 5 in the disconnected position.

FIG. 7 is a side view illustration of the support band of FIG. 5 in a connected position.

FIG. 8 is a side view illustration of a support band according to a third example.

FIG. 9 is a top view illustration of the support band of FIG. 8.

DETAILED DESCRIPTION

The disclosure herein relates to support bands for wearable electronic devices. The support bands that are described herein are adjustable to allow a user to conveniently adjust the fit of the support band so that the electronic device is comfortably supported with respect to a part of the user's body.

Figure 1:
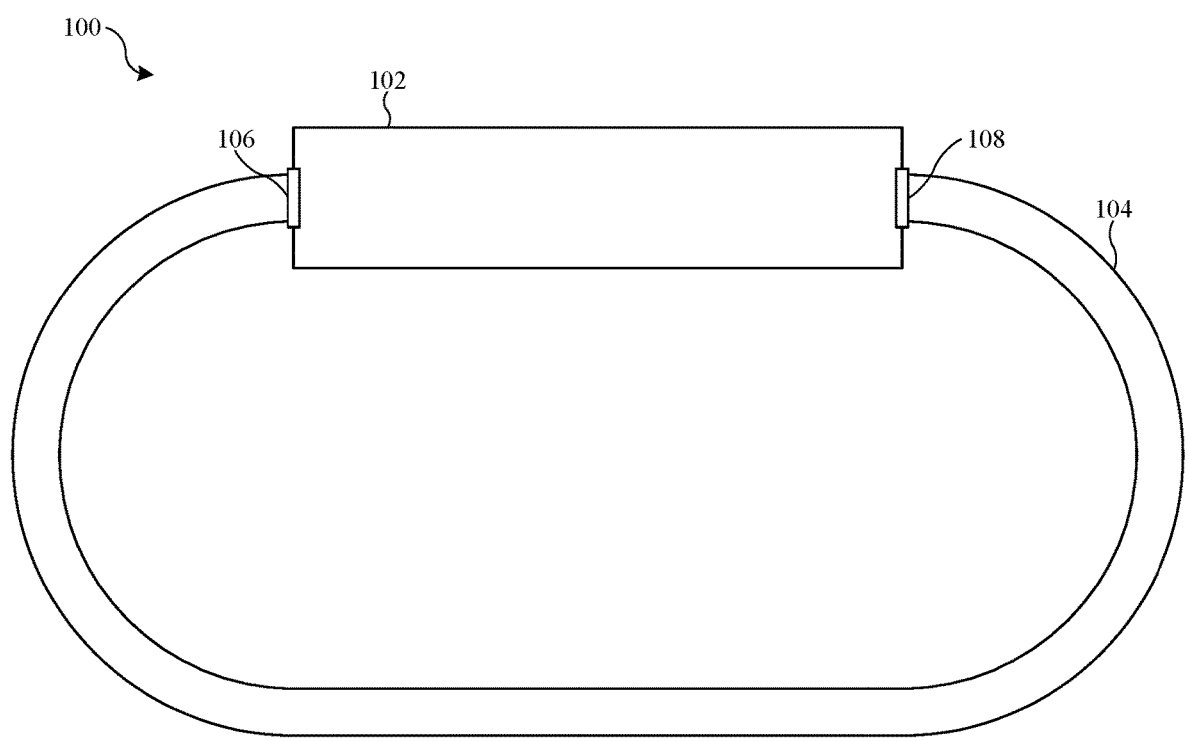
FIG. 1 is a side view illustration that shows an electronic device that includes a device housing and a support band.

FIG. 1 is a side view illustration that shows an electronic device 100. In the illustrated example, the electronic device 100 includes a device housing 102 and a support band 104.

The electronic device 100 is a wearable device that is configured to be secured to a portion of a user's body. As one example, the electronic device may be smart watch. As another example, the electronic device may be a computer-generated reality device (e.g., a head-mounted display device).

The device housing 102 is a structure that supports various other components that are included in the electronic device 100. The device housing 102 may have a size and shape that corresponds to the function the electronic device 100 and the location of the user's body where it is worn. As one example, if the electronic device 100 is implemented as a smart watch, the shape and size of the device housing 102 correspond generally to the size of an average user's arm. As another example, if the electronic device 100 is implemented as a head-mounted computer-generated reality device, the shape and size of the device housing 102 correspond generally to the width of an average user's head and the height between average user's forehead and cheekbones so that the device housing 102 may be positioned near the user's eyes.

The support band 104 is a component or collection of components that function to secure the device housing 102 in place with respect to the user's body so that the device housing 102 is restrained from moving with respect to user and maintains a comfortable position during use. Thus, the support band 104 is connected to the device housing 102 either by a releasable connection (e.g., movable between a connected position and a disconnected position) or by a non-releasable connection. In some implementations, the support band 104 is rigid. In some implementations, the support band 104 is flexible. In some implementations, the support band 104 includes one or more rigid portions and one or more flexible portions.

The support band 104 extends from a first end 106 to a second end 108. The first end 106 of the support band 104 is connected to the device housing 102 at a first location on the device housing 102. The second end 108 of the support band 104 is connected to the device housing 102 at a second location on the device housing 102.

The support band 104 is configured to extend around a portion of the user's body, such as around the user's wrist or around the user's head. As will be described further herein, the support band 104 is adjustable so that the electronic device 100 can be comfortably and securely worn by the user.

The first end 106 and the second end 108 of the support band 104 are secured to the device housing 102 of the electronic device 100 by connector structures. The connector structures may be releasable connector structures or non-releasable (e.g., fixed) connector structures. Examples of releasable connector structures include buckles, strap connectors, releasable mechanical couplers, or other structures that allow for a secure connection until intentionally released using a manually-operated or computer-controlled mechanism. Examples of fixed connector structures include mechanical fasteners of any suitable type. The connector structures may be single part or multiple part structures, and may include portions that are formed integrally with either or both of the device housing 102 and the support band 104.

Figure 2:
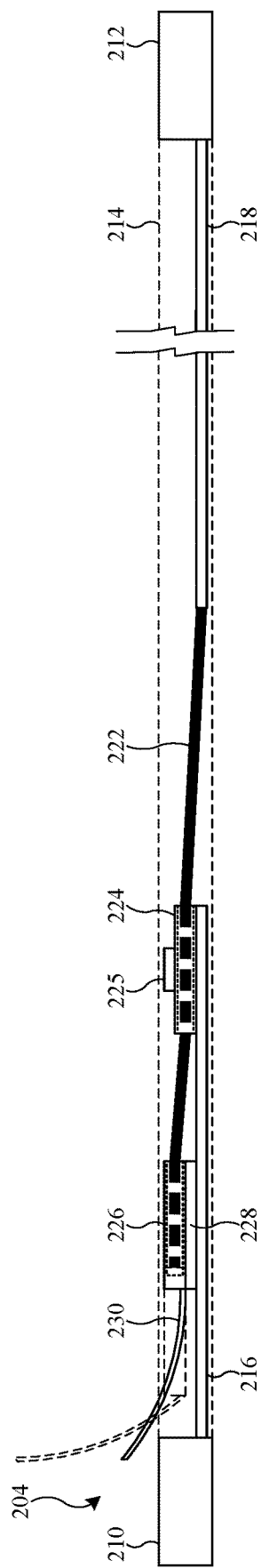
FIG. 2 is a side view illustration of a support band according to a first example.
Figure 3:
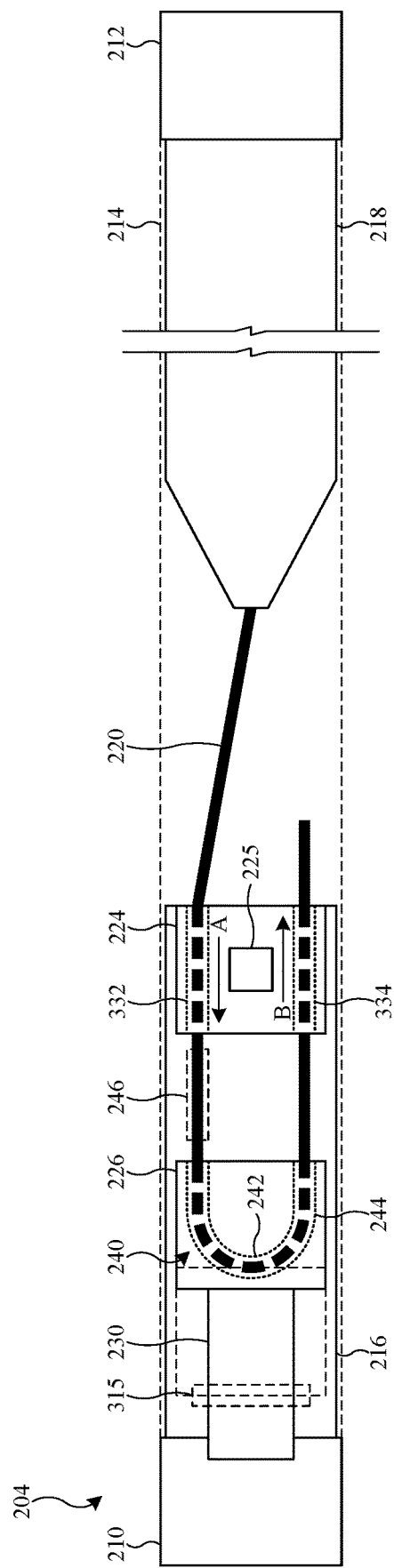
FIG. 3 is a top view illustration of the support band of FIG. 2.

FIG. 2 is a side view illustration of a support band 204 according to a first example. FIG. 3 is a top view illustration of the support band 204. The support band 204 is an implementation of the support band 104 of the electronic device 100, and the support band 204 can be included in the electronic device 100 in place of the support band 104. The description of the electronic device 100 and its components is applicable to the support band 204 and is incorporated herein.

The support band 204 is adjustable to allow the support band 204 to be worn by users of various sizes (e.g., wrist size, head size, etc.). The length of the support band 204 (e.g., the distance between opposite ends) may be changed by extension (e.g., increasing length) and contraction (e.g., decreasing length) as will be described.

The support band 204 includes a first end portion 210, a second end portion 212, a cover 214, a first band portion 216, a second band portion 218, and an adjustment assembly 220. The adjustment assembly 220 is configured to change the length of the support band 204 (e.g., the distance between the first end portion 210 and the second end portion 212) by allowing adjustment of a distance between the first band portion 216 and the second band portion 218.

The first end portion 210 and the second end portion 212 are examples of first and second rigid portions of the support band 204. It should be understood that the structure of the support band 204 may be implemented other than extending between end portions, such as between an end portion and an intermediate portion of a support band.

The first end portion 210 is a part of the support band 204 that is located at a first end of the support band 204. The first end portion 210 may be located adjacent to the device housing of an electronic device. The first end portion 210 may be connected to the device housing of an electronic device by a releasable connection, by a non-releasable connection, or by being formed integrally with the device housing, as described with respect to connection of the support band 104 to the device housing 102 of the electronic device 100.

The second end portion 212 is a part of the support band 204 that is located at a second end of the support band 204. The second end portion 212 may be located adjacent to the device housing of an electronic device. The second end portion 212 may be connected to the device housing of an electronic device by a releasable connection, by a non-releasable connection, or by being formed integrally with the device housing, as described with respect to connection of the support band 104 to the device housing 102 of the electronic device 100.

The cover 214 is an exterior portion of the support band 204. The cover 214 may extend from the first end portion 210 to the second end portion 212. In some implementations, a first end of the cover 214 is fixed to the first end portion 210 and a second end of the cover 214 is fixed to the second end portion 212.

The cover 214 may be configured so that other portions of the support band are located inside of the cover 214. In the illustrated example, the cover 214 defines a sleeve having an interior space. In this example, the first band portion 216, the second band portion 218, and portions of the adjustment assembly 220 are located inside the interior space of the sleeve that is defined by the cover 214. An opening 315 may be formed in the cover 214 to allow access to part of the adjustment assembly 220.

The cover 214 is configured to accommodate changes in length of the support band 204 in accordance with extension and contraction of the length of the support band 204 when it is adjusted by a user. Length changes can be accommodated, for example, by a structural configuration of the cover 214 or by a material selected for use as a primary portion of the cover 214.

As one example, the cover 214 can include, as a primary cover portion that extends around components of the support band 204, a flexible and inelastic material. In this example, the flexible inelastic material accommodates length changes by compression of excess material (e.g., by folding or gathering) in response to contraction of the length of the support band 204 and by expansion of the excess material in response to extension of the length of the support band 204.

As another example, the cover 214 can be formed from a flexible elastic material that accommodates length changes by stretching in accordance with extension and contraction of the length of the support band 204. As another example, the cover 214 may be in the form of a sleeve that is not fixed to the first end portion 210 or the second end portion 212, but instead is telescopically related to the first end portion 210 and the second end portion 212.

The first band portion 216 and the second band portion 218 are separate structures that are movable with respect to each other in order to extend and retract the length of the support band 204. The first band portion 216 is connected to the first end portion 210 of the support band 204. The first band portion 216 may be a flexible structure or may be a rigid structure. The second band portion 218 is connected to the second end portion 212 of the support band 204. The second band portion 218 may be a flexible structure or may be a rigid structure.

The adjustment assembly 220 includes a cable 222, a cable lock 224, a cable pull 226, a slide connector 228, and a pull tab 230. The adjustment assembly is configured to adjust the length of the support band 204 (e.g., a distance between the first end portion 210 and the second end portion 212) by changing a distance between the first band portion 216 and the second band portion 218.

The cable 222 is an elongate flexible member that is formed from a suitable material such as metal, plastic, natural textiles, or synthetic textiles. The cable 222 may be a braided or non-braided cable. As one example, the cable 222 may be a braided steel wire cable. The cable 222 may be inelastic or substantially inelastic so that it is able to function as a tensile member that carries a tension loading between the first band portion 216 and the second band portion 218.

The cable 222 connects the first band portion 216 to the second band portion 218. The length of the support band 204 is adjusted by changing the length of the cable 222 that extends between the first band portion 216 and a tension-bearing connection of the cable 222 to the second band portion 218. In the illustrated implementation, the cable 222 is adjustably connected to the first band portion 216 by the cable lock 224, which serves as a tension-bearing connection of the cable 222 to the first band portion 216 except when a release mechanism 225 of the cable lock 224 is operated. The cable 222 is connected to the second band portion 218 by a fixed connection (e.g., non-adjustable connection) that transfers tension loads between the cable 222 and the second band portion 218, such as by fastening structures of any suitable type. In an alternative implementation, the cable 222 could be adjustably connected to both of the first band portion 216 and the second band portion 218.

The cable lock 224 is connected to the first band portion 216. The cable lock 224 may be located at an opposite end of the first band portion 216 relative to the location of the first end portion 210 of the support band 204. The cable lock 224 includes a first passage 332 and a second passage 334 that each extend through the cable lock 224. The first passage 332 and the second passage 334 may be located side-by-side with respect to each other and may extend substantially parallel with respect to each other. The cable lock 224 includes locking features that allow the cable 222 to pass through the first passage 332 and the second passage 334 without significant resistance in a first direction while restraining passage of the cable 222 through the first passage 332 and the second passage 334 in a second direction that the opposite of the first direction. As an example, the locking features may include components that are drawn into engagement with the cable 222 in response to motion of the cable in the second direction to clamp the cable 222 with respect to a housing portion of the cable lock 224 and prevent further motion in the second direction, but which are not drawn into engagement with the cable 222 in response to motion of the cable 222 in the first direction.

In the illustrated example, the locking features included in the cable lock 224 allow the cable 222 to move through the first passage 332 in a direction indicated by arrow A, while restraining movement of the cable 222 through the first passage 332 in a direction opposite of the direction indicated by the arrow A. Similarly, the locking features included in the cable lock 224 allow the cable 222 to move through the first passage 332 in a direction indicated by arrow B, while restraining movement of the cable 222 through the first passage 332 in a direction opposite of the direction indicated by the arrow B. When the release mechanism 225 is engaged, the cable 222 is able to pass through the first passage 332 in the direction opposite the arrow A, and the cable 222 is able to pass through the second passage 334 in the direction opposite the arrow B.

Movement of the cable 222 through the first passage 332 and second passage 334 of cable lock 224 in the directions indicated by the arrow A and the arrow B corresponds to tightening of the support band 204, and this direction may be referred to as a tightening direction. Movement of the cable 222 through the first passage 332 and second passage 334 of cable lock 224 opposite the directions indicated by the arrow A and the arrow B while the release mechanism is engaged corresponds to loosening of the support band 204, and this direction may be referred to as a loosening direction. Thus, the cable lock 224 allows movement of the cable 222 in the tightening direction and the cable lock 224 restrains movement of the cable 222 in the loosening direction (e.g., by engagement of the locking features of the cable lock 224 with the cable 222) unless the release mechanism 225 is operated to release the locking features of the cable lock 224 with respect to the cable 222. The release mechanism 225 is operable to release engagement of locking features of the cable lock 224 with respect to the cable 222 so that the cable is able to move in the loosening direction when the release mechanism 225 is engaged.

Figure 4:
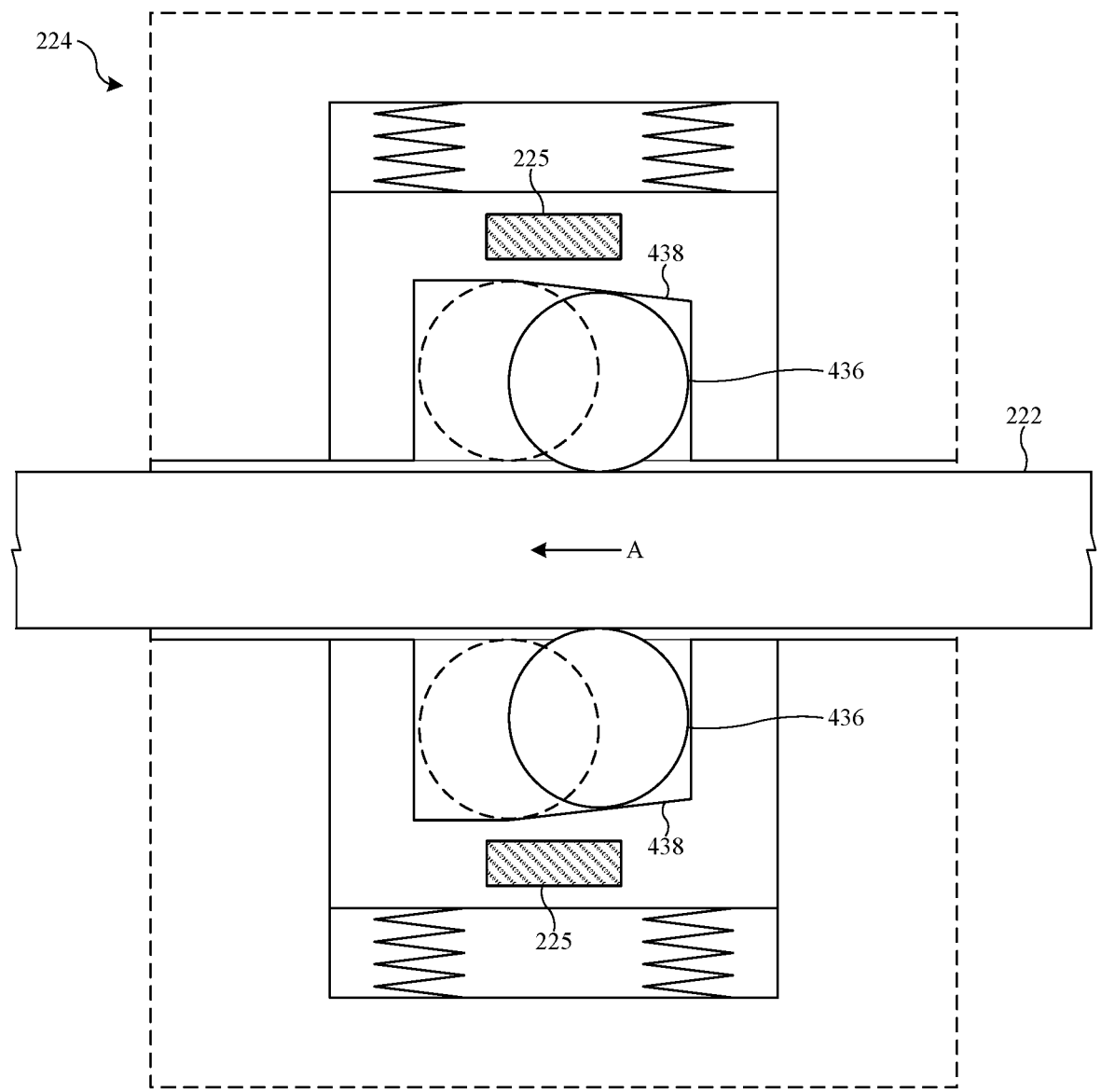
FIG. 4 is a cross-section view showing part of a cable lock of the support band of FIG. 2.

In one implementation, as seen in FIG. 4, the locking features of the cable lock 224 may be implemented using locking balls 436 disposed in engagement with tapered surfaces 438 along the first passage 332 (shown in FIG. 4) and the second passage 334, wherein the tapered surfaces 438 act as cam surfaces that draw the locking balls into engagement with the cable 222 in response to motion in the second direction, but allow the locking balls to release (e.g., as shown in dashed lines) in response to motion in the first direction as indicated by arrow A. The tapered surfaces 438 may be incorporated in a structure that is moved away from the cable 222 in response to operation of the release mechanism 225 so that the locking balls do not restrain the cable 222 while the release mechanism 225 is engaged.

The cable pull 226, the slide connector 228, and pull tab 230 are located on the first band portion 216 between the cable lock 224 and the first end portion 210 of the support band 204. The cable pull 226 is connected to the first band portion 216 by the slide connector 228, and the pull tab 230 is connected to the cable pull 226 and extends out of the opening 315.

The pull tab 230 extends through the opening 315 so that it can be grasped by a user in order to operate the cable pull 226. The slide connector 228 connects the cable pull 226 to the first band portion 216 so that the cable pull 226 is able to slide with respect to the first band portion 216. Thus, the cable pull 226 is slidingly connected to the first band portion 216. In FIGS. 2-3, the cable pull 226 is shown in an initial position, with an extended position indicated by dashed lines. The cable pull 226 is able to slide toward the first end portion 210 of the support band 204 to an extended position. For example, the cable pull 226 may move to the extended position when a user grasps the pull tab 230 and uses the pull tab 230 to pull the cable pull 226 from the initial position to the extended position. This movement may be referred to herein as an extension stroke of the cable pull 226. The slide connector 228 applies a biasing force to the cable pull 226 that urges the cable pull 226 to return to the initial position. Thus, the cable pull 226 may move from the extended position to the initial position in response to the biasing force applied to the slide connector 228 when, for example, the pull tab 230 is released by the user. This movement of the cable pull 226 from the extended position to the initial position may be referred to herein as a return stroke of the cable pull 226.

The cable pull 226 is configured to allow adjustment of the length of the support band 204 by reducing the length of the cable 222 between the cable lock 224 on the first band portion 216 and the second band portion 218 in response to an extension stroke and release stroke of the cable pull 226. The cable pull 226 is further configured to allow adjustment of the length of the support band 204 by increasing the length of the cable 222 that is located between the cable lock 224 and the first band portion when the release mechanism 225 of the cable lock 224 is operated and tension is applied to the support band 204 to thereby pull the cable 222 through the first passage 332 and the second passage 334 in opposition of the directions of the arrow A and the arrow B.

During the extension stroke, the cable pull 226 applies tension to a part of the cable 222 that is located between the first passage 332 and the second passage 334 of the cable lock 224. In response to the tension applied to the cable 222, a portion of the cable is pulled through the first passage 332 of the cable lock 224 toward the cable pull 226 (e.g., the cable 222 moves through the first passage 332 in the direction of the arrow A). The cable 222 is restrained from pulling out of the second passage 334 of the cable lock 224 toward the cable pull 226 by the locking features of the cable lock 224 (e.g., the cable 222 is restrained from moving with respect to the second passage 334 in opposition to the direction of the arrow B). Thus, the extension stroke decreases the length of a portion of the cable that is located between the second band portion 218 and the cable lock 224 and the extension stroke increases the length of the cable 222 that is located between the first passage 332 and the second passage 334 of the cable lock 224.

During the extension stroke, the cable lock 224 does not restrain movement of the cable 222 through the first passage 332 in the direction of the arrow A, and instead, allows movement of the cable 222 through the first passage 332 in the direction of the arrow A. During the extension stroke, the cable lock 224 does not allow movement of the cable 222 through the second passage 334 in opposition to the direction of the arrow B, and instead restrains movement of the cable 222 through the second passage 334 in opposition to the direction of the arrow B.

During the return stroke, the cable pull 226 is moved toward the initial position from the extended position and while moving in this direction pushes (e.g., applies a compressive force) to the portion of the cable 222 that is located between the first passage 332 and the second passage 334 of the cable lock 224. The cable 222 is restrained from passing through the first passage 332 in the direction opposite that of the arrow A by the locking features of the cable lock 224. The cable 222 is able to pass through the second passage 334 in the direction of the arrow B, thereby increasing the length of the part of the cable 222 that is located between the second passage 334 and an end portion of the cable 222, which may be a free end of the cable 222.

During the return stroke, the cable lock 224 does not restrain movement of the cable 222 through the second passage 334 in the direction of the arrow B, and instead, allows movement of the cable 222 through the second passage 334 in the direction of the arrow B. During the return stroke, the cable lock 224 does not allow movement of the cable 222 through the first passage 332 in opposition to the direction of the arrow A, and instead restrains movement of the cable 222 through the first passage 332 in opposition to the direction of the arrow A.

The cable pull 226 is movably mounted to the first band portion 216 by the slide connector 228 and includes a structural configuration that is operable to apply forces to the cable 222 during the extension stroke of the cable pull 226 and during the return stroke of the cable pull 226. In the illustrated example, the cable pull 226 defines a cable path 240 that guides the cable 222 through a curve that turns the cable 222 between the first passage 332 of the cable lock 224 and the second passage 334 of the cable lock. As examples, the cable path 240 may define a substantially u-shaped portion or a substantially one-hundred and eighty degree turn for a portion of the cable 222 between the first passage 332 and the second passage 334 of the cable lock 224. Thus, a portion of the cable 222 (e.g., a first portion of the cable 222) defines a u-shaped portion between the first passage 332 and the second passage 334 of the cable lock 224, and the cable pull 226 is engageable with the u-shaped portion of the cable 222.

The cable path 240 of the cable pull 226 includes a first surface 242 (which may comprise multiple surfaces, e.g., one or more first surfaces) that engages the cable 222 during the extension stroke to pull the cable 222 through the first passage 332 of the cable lock 224. Thus, the first surface 242 of the cable path 240 is engageable with the cable 222 to apply tension to the portion of the cable 222 that extends between the first passage 332 and the second passage 334 of the cable lock 224. As an example, the cable path 240 may define a curve that is followed by the cable 222, wherein the first surface 242 defines an inside surface of the curve that is defined by the cable path 240.

The cable path 240 of the cable pull 226 includes a second surface 244 (which may comprise multiple surfaces, e.g., one or more first surfaces) that engages the cable 222 during the return stroke to push the cable 222 through the second passage 334 of the cable lock 224. Thus, the second surface 244 of the cable path 240 is engageable with the cable 222 to apply compression to the portion of the cable 222 that extends between the first passage 332 and the second passage 334 of the cable lock 224. As an example, the cable path 240 may define a curve that is followed by the cable 222, wherein the second surface 244 defines an outside surface of the curve that is defined by the cable path 240, wherein the outside surface of the curve has a larger radius than the inside surface of the curve.

The cable path 240 may be defined by structures of various types that are able to define a curve and engage the cable 222 while the cable 222 slides along the cable path 240 through the cable pull 226 during the extension stroke and the return stroke of the cable pull 226. As one example, the cable path may be defined by a series of loops of cord, fabric, plastic or other material that are spaced apart along the cable path 240 so that each is aligned with the cable path and so that each defines an interior surface portion and an exterior surface portion of the cable path 240. As another example, the cable path 240 may be defined in the form of a passage (e.g., a tunnel) that is formed through a material, which may be rigid or flexible. As another example, the cable path 240 may be defined by a first rigid wall portion and a second rigid wall portion. In this example, the first rigid wall portion is located along the outside of the curve defined by the cable path 240 and serves as the first surface 242 of the cable path 240, and the second rigid wall portion is located along the inside of the curve defined by the cable path 240 and serves as the second surface 244 of the cable path 240. As another example, the first surface 242 of the cable path 240 and the second surface 244 of the cable path 240 may each be defined by a series of spaced apart rigid structures, such as pins, posts, or other structures.

To limit folding or kinking of the cable 222 between the first passage 332 of the cable lock 224 and the cable pull 226 when compression is applied to the cable 222 during the return stroke of the cable pull 226, a guide structure 246 may be located along the cable 222 between the first passage 332 of the cable lock 224 and the cable pull 226. The guide structure 246 may be connected to the first band portion 216, the guide structure 246 may be connected to the cable lock 224, and/or the guide structure 246 may be connected to the cable pull 226. As one example, the guide structure 246 may be flexible elements or rigid elements that are located along the cable 222 between the cable lock 224 and the cable pull 226 to engage the cable 222 between the cable lock 224 and the cable pull 226. As another example, the guide structure 246 may be a rigid element, such as a tube or walls, that is connected to the one of the cable lock 224 or the cable pull 226 to engage the cable 222 between the cable lock 224 and the cable pull 226. As another example, the guide structure 246 may be include a first rigid element, such as a tube or walls, that is connected to the cable lock 224, and a second rigid element, such as a tube or walls, that is connected to the cable pull 226, wherein the first rigid element and the second rigid element define a telescoping structure between the cable lock 224 and the cable pull 226 to engage the cable 222 between the cable lock 224 and the cable pull 226.

FIG. 5 is a side view illustration of a support band 504 according to a second example in a disconnected position. FIG. 6 is a top view illustration of the support band 504 in the disconnected position. FIG. 7 is a side view illustration of the support band 504 in a connected position. The support band 504 is an implementation of the support band 104 of the electronic device 100, and the support band 504 can be included in the electronic device 100 in place of the support band 104. The description of the electronic device 100 and its components is applicable to the support band 504 and is incorporated herein.

The support band 504 is adjustable to allow the support band 504 to be worn by users of various sizes (e.g., wrist size, head size, etc.). The length of the support band 504 (e.g., the distance between opposite ends) may be changed by extension (e.g., increasing length) and contraction (e.g., decreasing length) as will be described.

The support band 504 includes a first end portion 510, a second end portion 512, a cover 514, a first band portion 516, a second band portion 518, a first elastic portion 550, a second elastic portion 552, and tension straps 554.

The first end portion 510 and the second end portion 512 are examples of first and second rigid portions of the support band 504. It should be understood that the structure of the support band 504 may be implemented other than extending between end portions, such as between an end portion and an intermediate portion of a support band.

The first end portion 510 is a part of the support band 504 that is located at a first end of the support band 504. The first end portion 510 may be located adjacent to the device housing of an electronic device. The first end portion 510 may be connected to the device housing of an electronic device by a releasable connection, by a non-releasable connection, or by being formed integrally with the device housing, as described with respect to connection of the support band 104 to the device housing 102 of the electronic device 100.

An aperture 511 is formed in the first end portion 510. The aperture 511 is configured (e.g., in terms of shape and size) to allow the first band portion 516 to pass through it, for example, by sliding, to define an adjustable connection between the first end portion 510 and the first band portion 516. As an example, the aperture 511 may be a slot like opening that is formed through the first end portion 510.

The second end portion 512 is a part of the support band 504 that is located at a second end of the support band 504. The second end portion 512 may be located adjacent to the device housing of an electronic device. The second end portion 512 may be connected to the device housing of an electronic device by a releasable connection, by a non-releasable connection, or by being formed integrally with the device housing, as described with respect to connection of the support band 104 to the device housing 102 of the electronic device 100.

An aperture 513 is formed in the second end portion 512. The aperture 513 is configured (e.g., in terms of shape and size) to allow the first band portion 516 to pass through it, for example, by sliding, to define an adjustable connection between the second end portion 512 and the second band portion 518. As an example, the aperture 513 may be a slot like opening that is formed through the second end portion 512.

The cover 514 is an exterior portion of the support band 504. The cover 514 may extend from the first end portion 510 to the second end portion 512. In the illustrated implementation, the cover 514 extends less than the entire distance between the first end portion 510 and the second end portion 512 and is configured as a sleeve that extends between a first open end near the first end portion 510 and a second open end near the second end portion 512. In some implementations, a first end of the cover 514 is fixed to the first end portion 510 and a second end of the cover 514 is fixed to the second end portion 512.

The cover 514 may be configured so that other portions of the support band 504 are located inside of the cover 514. In the illustrated example, the cover 514 defines a sleeve having an interior space. In this example, portions of the first band portion 516, the second band portion 518, the first elastic portion 550, the second elastic portion 552, and the tension straps 554 are located inside the interior space of the sleeve that is defined by the cover 514. As one example, the cover 514 may be slidingly connected to another portion of the support band 504, such as the second band portion 518. As another example, the cover 514 may be fixedly connected to another portion of the support band 504, such as the second band portion 518. The cover 514 may be elastic or inelastic. Additional configurations that may be used for the cover 514 are discussed with respect to the cover 214.

The first band portion 516 and the second band portion 518 are separate structures that are movable with respect to each other in order to allow adjustment of the support band 504. The first band portion 516 is connected to the first end portion 510 of the support band 504. The first band portion 516 and the second band portion 518 are flexible structures. In some implementations, the first band portion 516 and the second band portion 518 may include rigid portions.

The first band portion 516 is adjustably connected to the first end portion 510. In the illustrated implementation, the first band portion 516 extends through the aperture 511 that is formed through the first end portion 510, with a first part of the first band portion 516 extending between a first end (e.g., free end) of the first band portion 516 and the aperture 511 of the first end portion 510, and a second part of the first band portion extending between the aperture 511 of the first end portion 510 and connections with the second band portion 518 through the first elastic portion 550 and the tension straps 554, as will be discussed further herein. Sliding the first band portion 516 relative to the aperture 511 changes the relative lengths of the first part and the second part to adjust the support band 504.

The connected position and the disconnected position of the first band portion 516 are defined by connection and disconnection of a releasable connector that is located on the first band portion 516. In the illustrated example, the releasable connector of the first band portion 516 includes a first connector portion 556 and a second connector portion 557. The first connector portion 556 is formed on the first band portion 516 near the first end for connection to the second connector portion 557. The second connector portion 557 is located on a portion of the support band 504. In the illustrated example, the second connector portion 557 is located on the cover 514 to secure the first end of the first band portion 516 to the cover 514 to define a connected position of the first band portion 516. As alternatives, the second connector portion 557 may be formed on the first band portion 516 (e.g., near a second end of the first band portion 516 opposite the first end) or the second connector portion 557 may be formed on the second band portion 518. The first connector portion 556 and second connector portion 557 may be complementary fastener structures of any type that are able to be connected to each other, such as hook and loop fasteners, a snap fastener, a buckle, or any other suitable type of fastener structure.

The second band portion 518 is adjustably connected to the second end portion 512. In the illustrated implementation, the second band portion 518 extends through the aperture 513 that is formed through the second end portion 512, with a first part of the second band portion 518 extending between a first end (e.g., free end) of the second band portion 518 and the aperture 513 of the second end portion 512, and a second part of the second band portion 518 extending between the aperture 513 of the second end portion 512 and connections with the first elastic portion 550, the second elastic portion 552, and the tension straps 554 as will be discussed further herein. Sliding the second band portion 518 relative to the aperture 513 changes the relative lengths of the first part and the second part of the second band portion 518 to adjust the support band 504.

The connected position and the disconnected position of the second band portion 518 are defined by connection and disconnection of a releasable connector that is located on the second band portion 518. In the illustrated example, the releasable connector of the second band portion 518 includes a first connector portion 558 and a second connector portion 559. The first connector portion 558 is formed on the second band portion 518 near the first end for connection to the second connector portion 559. The second connector portion 559 is located on a portion of the support band 504. In the illustrated example, the second connector portion 559 is located on the cover 514 to secure the first end of the second band portion 518 to the cover 514 to define a connected position of the second band portion 518. As an alternative, the second connector portion 559 may be formed on the second band portion 518 and positioned so that the first connector portion 558 and the second connector portion 559 are on opposite sides of the aperture 513 of the second end portion 512. The first connector portion 558 and second connector portion 559 may be complementary fastener structures of any type that are able to be connected to each other, such as hook and loop fasteners, a snap fastener, a buckle, or any other suitable type of fastener structure.

The first band portion 516 and the second band portion 518 are adjustable and are configured to allow the user to change the length of the support band 504 (e.g., the distance between the first end portion 510 and the second end portion 512). The second band portion 518 is configured to allow gross adjustment of the length of the support band 504, while the first band portion 516 is configured to allow fine adjustment of the length of the support band 504 and the tightness of the fit of the support band 504. The first elastic portion 550 is configured to retract the first band portion 516 when the first band portion 516 is in the disconnected position. The second elastic portion 552 is configured to define a compliant connection between the first end portion 510 and the second end portion 512 when the first band portion 516 is in the disconnected position.

The first band portion 516 is connected to the second band portion 518 by the first elastic portion 550. The first elastic portion 550 is connected (e.g., by stitching, adhesives, or other fasteners) to the first band portion 516 at the second end of the first band portion 516, for example, at a first connection location 555a. The first elastic portion 550 is also connected (e.g., by stitching, adhesives, or other fasteners) to the second band portion 518 at an intermediate location along the second band portion 518, for example, at a second connection location 555b. The first elastic portion 550 is a flexible elastic member that can stretch lengthwise, while applying a force urging return to its original, unstretched length. The first elastic portion 550 applies a force to the first band portion 516 that retracts the first band portion 516 toward the second band portion 518 when the first band portion 516 is disconnected.

The first band portion 516 is also connected to the second band portion 518 by the tension straps 554 (e.g., connected by stitching, adhesives, or other fasteners). The tension straps 554 may be connected to the first band portion 516 at or near the second end of the first band portion 516, for example, at the first connection location 555a. The tension straps 554 may be connected to the second band portion 518 at an intermediate location along the second band portion 518, for example, at a third connection location 555c, which in this example is between the second connection location 555b and an end of the first band portion 516. The tension straps 554 (e.g., which may be one or more tension straps) are flexible and inelastic members that are not under tension when the first band portion 516 is in the disconnected position, but are placed under tension when the first band portion 516 is moved to the connected position. Thus, when the first band portion 516 is in the connected position, the tension straps transmit tension between the first band portion 516 and the second band portion 518 and define part of the primary tension-carrying connection between the first end portion 510 and the second end portion 512 of the support band 504 when the first band portion 516 is in the connected position and the second band portion 518 is in the connected position.

The second band portion 518 is connected to the first end portion 510 by the second elastic portion 552. The second elastic portion 552 is connected (e.g., by stitching, adhesives, or other fasteners) to the first end portion 510, for example, at a first connection location 555d. The second elastic portion 552 is also connected (e.g., by stitching, adhesives, or other fasteners) to the second band portion 518 at a second end of the second band portion 518, for example, at a first connection location 555e. The second elastic portion 552 is a flexible elastic member that can stretch lengthwise, while applying a force urging return to its original, unstretched length.

The components of the support band 504 define a first load path and a second load path that each extend between the first end portion 510 and the second end portion 512. The first load path and the second load path each function to transmit tension forces between the first end portion 510 and the second end portion 512.

The first load path is the primary path by which tension is transmitted between the first end portion 510 and the second end portion 512 when the first band portion 516 is in the disconnected position (FIGS. 5-6). The second elastic portion 552 defines part of the first load path in order to define a compliant connection between the first end portion 510 and the second end portion 512 when the first band portion is in the disconnected position. The compliant fit provided by the first load path allows the user to place the support band 504 (and the electronic device connected to it) on their body comfortably while the first band portion 516 is disconnected.

The second load path is the primary path by which tension is transmitted between the first end portion 510 and the second end portion 512 when the first band portion 516 is in the connected position (FIG. 7). When the user connects the first band portion 516 (e.g., moves the first band portion 516 from the disconnected position to the connected position), tension is transmitted between the first band portion 516 and the second band portion 518, for example, across the tension straps 554. Moving the first band portion 516 to the connected position shortens the distance between the second band portion 518 and the first end portion 510 until the second elastic portion 552 is returned to its unstretched length and therefore no longer carries tension, so that tension between the first end portion 510 and the second end portion 512 is instead transmitted between the first band portion 516 and the second band portion 518 by an inelastic member (e.g., the tension straps 554) so that a non-compliant fit of the support band 504 is established and the support band 504 can be tightened securely and comfortably.

FIG. 8 is a side view illustration of a support band 804 according to a third example. FIG. 9 is a top view illustration of the support band 804. The support band 804 is an implementation of the support band 104 of the electronic device 100, and the support band 804 can be included in the electronic device 100 in place of the support band 104. The description of the electronic device 100 and its components is applicable to the support band 804 and is incorporated herein.

The support band 804 is adjustable to allow the support band 804 to be worn by users of various sizes (e.g., wrist size, head size, etc.). The length of the support band 804 (e.g., the distance between opposite ends) may be changed by extension (e.g., increasing length) and contraction (e.g., decreasing length) as will be described.

The support band 804 includes a first end portion 810, a second end portion 812, a band portion 816 and an adjustment assembly 820. The adjustment assembly 820 is configured to change the length of the support band 804 by adjusting the distance between the first end portion 810 and the second end portion 812.

The first end portion 810 and the second end portion 812 are examples of first and second rigid portions of the support band 804. It should be understood that the structure of the support band 804 may be implemented other than extending between end portions, such as between an end portion and an intermediate portion of a support band.

The first end portion 810 is a part of the support band 804 that is located at a first end of the support band 804. The first end portion 810 may be located adjacent to the device housing of an electronic device. The first end portion 810 may be connected to the device housing of an electronic device by a releasable connection, by a non-releasable connection, or by being formed integrally with the device housing, as described with respect to connection of the support band 104 to the device housing 102 of the electronic device 100.

The second end portion 812 is a part of the support band 804 that is located at a second end of the support band 804. The second end portion 812 may be located adjacent to the device housing of an electronic device. The second end portion 812 may be connected to the device housing of an electronic device by a releasable connection, by a non-releasable connection, or by being formed integrally with the device housing, as described with respect to connection of the support band 104 to the device housing 102 of the electronic device 100.

The band portion 816 is a flexible structure that extends from the first end portion 810 to the second end portion 812. The band portion 816 may be connected to, partially cover, or fully cover the first end portion 810 and the second end portion 812. The band portion 816 may be in the form of a sleeve or otherwise define internal spaces that portions of the adjustment assembly 820 may be located in. As one example, the band portion 816 may be in the form of a sleeve that extends from the first end portion 810 to the second end portion 812, with portions of the adjustment assembly 820 being located in the sleeve.

The band portion 816 is flexible so that it can accommodate length changes and so that it can adapt to the shape of the user's body. The band portion 816 may be formed from a flexible elastic material so that it can stretch to accommodate length changes. As an example, the band portion 816 may be formed from a flexible and elastic textile material.

The adjustment assembly 820 includes an adjustment reel 860 and a cable 862. The adjustment reel 860 is located on and connected to the first end portion 810. The adjustment reel 860 is a manual adjustment structure that allows the length of the support band 804 to be adjusted by extending or retracting the cable 862. The adjustment reel 860 is operable to change a length of the cable 862 that extends between the adjustment reel 860 and the second end portion 812 of the support band 804.

The cable 862 is a flexible member such as a steel cable, a plastic cable, or a textile cable and may be braided or solid (e.g., monofilament). The cable 862 has a first end that is connected to the first end portion 810 by the adjustment reel 860 and a second end that is connected to the second end portion 812 at a connection location 863. As an example, the cable 862 may be directly connected to the second end portion 812 at the connection location 863 using any suitable type of fastening technique or mechanical fastening device. Thus, using the adjustment reel 860, the user may tighten the support band 804, by winding part of the cable 862 onto the adjustment reel 860 and thereby decreasing the length of the cable 862 between the first end portion 810 and the second end portion 812 of the support band 804. Similarly, the user may loosen the support band 804 by unwinding part of the cable 862 from the reel and thereby increasing the length of the cable 862 between the first end portion 810 and the second end portion 812 of the support band 804.

Figure 10:
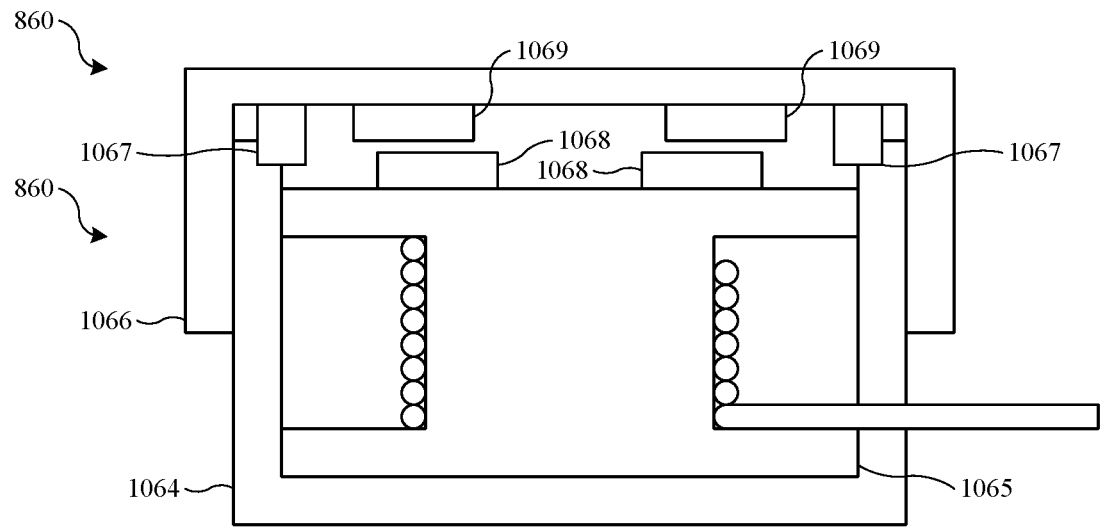
FIG. 10 is a schematic cross-section illustration that shows an adjustment reel of the support band of FIG. 8 in a disengaged position.
Figure 11:
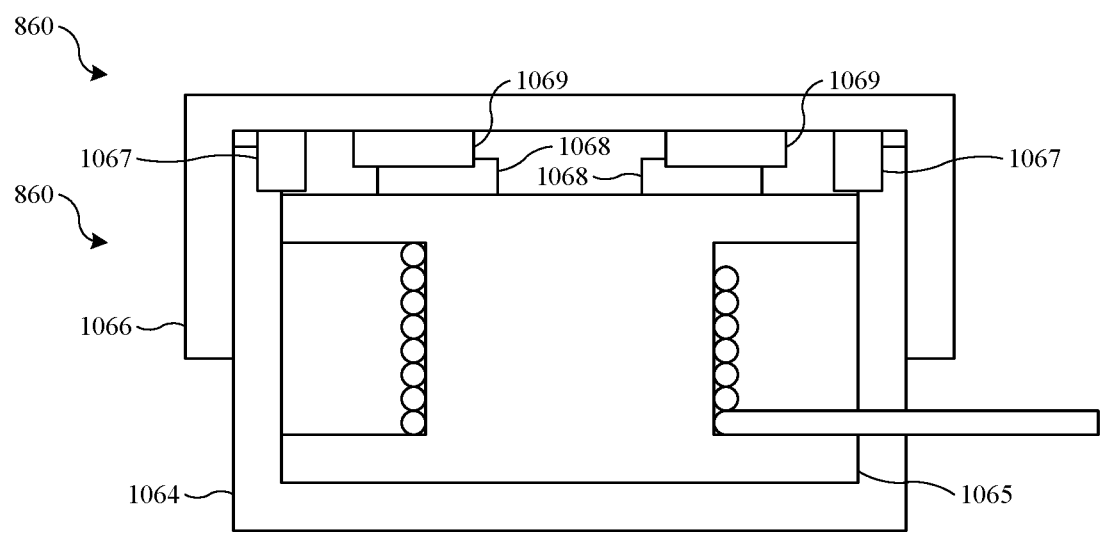
FIG. 11 is a schematic cross-section illustration that shows the adjustment reel of the support band of FIG. 9 an engaged position.

FIG. 10 is a schematic cross-section illustration that shows the adjustment reel 860 in a disengaged position. FIG. 11 is a schematic cross-section illustration that shows the adjustment reel 860 in an engaged position. The adjustment reel 860 includes a housing 1064, a reel 1065, a knob 1066, and a ratchet 1067. The adjustment reel 860 is movable between an engaged position, in which the cable 862 can be tightened, and a released position, in which the cable 862 may be freely loosened by apply tension (e.g., by pulling) to the cable 862.

The housing 1064 is a structure that encloses the reel 1065. As an example, the housing 1064 may include walls that define a cylindrical interior space, with the reel 1065 located in the cylindrical interior space. The reel 1065 is a rotatable component that is connected to the cable 862. When rotated in a tightening direction, part of the cable 862 is wound onto the reel 1065. When rotated in a loosening direction, part of the cable 862 is unwound from the reel 1065. The cable 862 may extend through an aperture that is formed in the housing 1064.

The knob 1066 is rotatably mounted with respect to the housing 1064 and functions to rotate the reel 1065 in the tightening direction of the reel 1065 to tighten the cable 862 and thereby decrease the length of the support band 804. Motion of the knob 1066 with respect to the housing is regulated by the ratchet 1067 (e.g., using a pawl and gear teeth to limit motion to a single direction), which allows the knob 1066 to turn only in the tightening direction of the reel 1065. The ratchet 1067 restrains the knob 1066 from turning in the loosening direction of the reel 1065.

To allow tightening and loosening, the knob 1066 is mounted to the housing 1064 so that it may translate along a longitudinal axis of the housing 1064 toward and away from the reel 1065. The disengaged position (FIG. 10) and the engaged position (FIG. 11) of the adjustment reel 860 correspond to disengagement and engagement of reel-side engagement features 1068 that are formed on the reel 1065 and knob-side engagement features 1069 that are formed on the knob 1066. The knob 1066 is restrained from rotating in the loosening direction by the ratchet 1067 in both the engaged position and the disengaged position. The knob 1066 is able to rotate (e.g., not restrained by the ratchet 1067) in the tightening direction in both the engaged position and the disengaged position. In the engaged position, the knob-side engagement features 1069 and the reel-side engagement features 1068 engage each other to enforce uniform rotation of the knob 1066 and the reel 1065, thereby restraining rotation of the reel 1065 in the loosening direction. In the disengaged position, the reel 1065 is able to rotate independent of the knob 1066, which allows the reel 1065 to rotate in the loosening direction.

In the disengaged position of the adjustment reel 860, the knob 1066 is translated away from the reel 1065 and the knob-side engagement features 1069 are spaced from the reel-side engagement features 1068 so that the knob 1066 is not operable to cause the reel 1065 to rotate in the tightening direction and is not operable to restrain rotation of the reel 1065 in the loosening direction. In the engaged position of the adjustment reel 860, the knob 1066 is translated toward from the reel 1065 and the knob-side engagement features 1069 are in engagement with the reel-side engagement features 1068 so that the knob 1066 is operable to cause rotation of the reel 1065 in the tightening direction and the knob 1066, by operation of the ratchet 1067, is operable to restrain rotation of the reel 1065 in the loosening direction.

With further reference to FIGS. 8-9, the user may tighten the support band 804 by turning the knob 1066 of the adjustment reel 860 in the tightening direction while the adjustment reel 860 is in the engaged position. The user may loosen the support band 804 by moving the adjustment reel 860 from the engaged position to the disengaged position, so that the reel 1065 is no longer restrained from rotating in the loosening direction, thereby allowing the reel 1065 to rotate in the loosening direction so that the cable 862 may unwind from the reel 1065 in response to a force applied to the band portion 816 of the support band 804.

Figure 12:
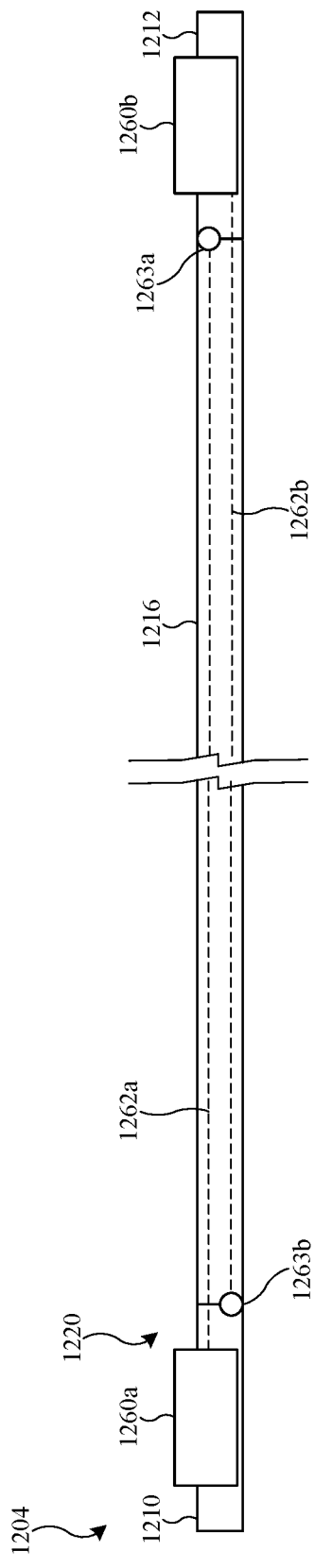
FIG. 12 is a side view illustration of a support band according to a fourth example.
Figure 13:
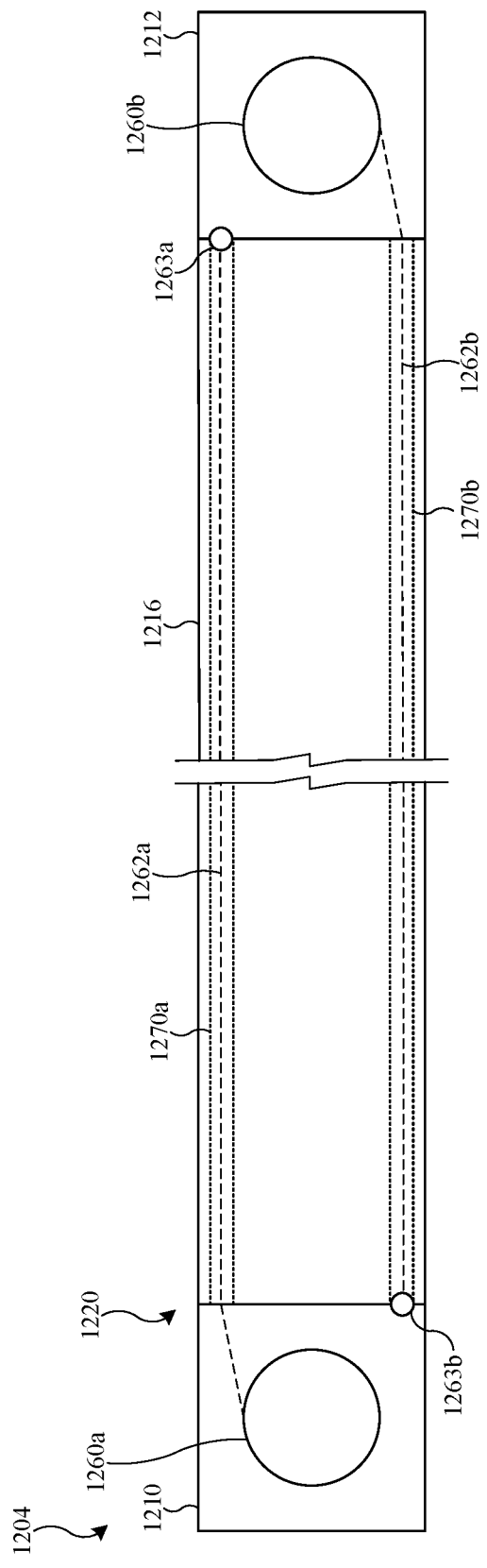
FIG. 13 is a top view illustration of the support band of FIG. 12.

FIG. 12 is a side view illustration of a support band 1204 according to a fourth example. FIG. 13 is a top view illustration of the support band 1204. The support band 1204 is an implementation of the support band 104 of the electronic device 100, and the support band 1204 can be included in the electronic device 100 in place of the support band 104. The description of the electronic device 100 and its components is applicable to the support band 1204 and is incorporated herein. The support band 1204 includes a first end portion 1210, a second end portion 1212, a band portion 1216 and an adjustment assembly 1220. The first end portion 1210, the second end portion 1212, and the band portion 1216 of the support band 1204 are equivalent to the first end portion 810, the second end portion 812, and the band portion 816 of the support band 804 except as described herein. The first end portion 1210 and the second end portion 1212 are examples of first and second rigid portions of the support band 1204, and the band portion 1216 is an example of a flexible portion of the support band 1204. It should be understood that the structure of the support band 1204 may be implemented other than extending between end portions, such as between an end portion and an intermediate portion of a support band.

The adjustment assembly 1220 includes a first adjustment reel 1260*a*, a second adjustment reel 1260*b*, a first cable 1262*a*, and a second cable 1262*b*. The first adjustment reel 1260*a* and the second adjustment reel 1260*b* are implemented in the manner described with respect to the adjustment reel 860. The first adjustment reel 1260*a* is connected to and located on the first end portion 1210 and is connected to the first cable 1262*a*, which extends from the first adjustment reel 1260*a* to a first connection location 1263*a* where the first cable 1262*a* is connected to the second end portion 1212. The second adjustment reel 1260*b* is connected to and located on the second end portion 1212 and is connected to the second cable 1262*b*, which extends from the second adjustment reel 1260*b* to a second connection location 1263*b* where the second cable 1262*b* is connected to the first end portion 1210.

The first cable 1262*a* and the second cable 1262*b* each extend in a longitudinal direction of the support band 1204, and may extend generally parallel to each other. The first cable 1262*a* is disposed in a first passage 1270*a* that is defined in the band portion 1216 along a first longitudinal edge of the support band 1204. The second cable 1262*b* is disposed in a second passage 1270*b* that is defined in the band portion 1216 along a second longitudinal edge of the support band 1204. The first passage 1270*a* and the second passage 1270*b* constrain the lateral positions of the first cable 1262*a* and the second cable 1262*b* with respect to the band portion 1216 so that the first cable 1262*a* and the second cable 1262*b* are positioned near and extend along opposite edges of the band portion 1216 and are spaced from one another in a width direction of the band portion 1216.

The user may tighten the support band 1204 using the first adjustment reel 1260*a* and the second adjustment reel 1260*b* as described with respect to the adjustment reel 860. The first adjustment reel 1260*a* and the second adjustment reel 1260*b* are independently operable, allowing the length of the support band 1204 to be adjusted independently along the first longitudinal edge and the second longitudinal edge of the band portion 1216. This independent adjustment also allows for adjustment of a curvature of the band portion 1216. To accommodate changes in the lateral width of the band portion 1216 in response to independent adjustment of the first cable 1262*a* and the second cable 1262*b*, the flexible elastic material used in the band portion 1216 may be elastic both in the length direction of the band portion 1216 and in the width direction of the band portion 1216.

Figure 14:
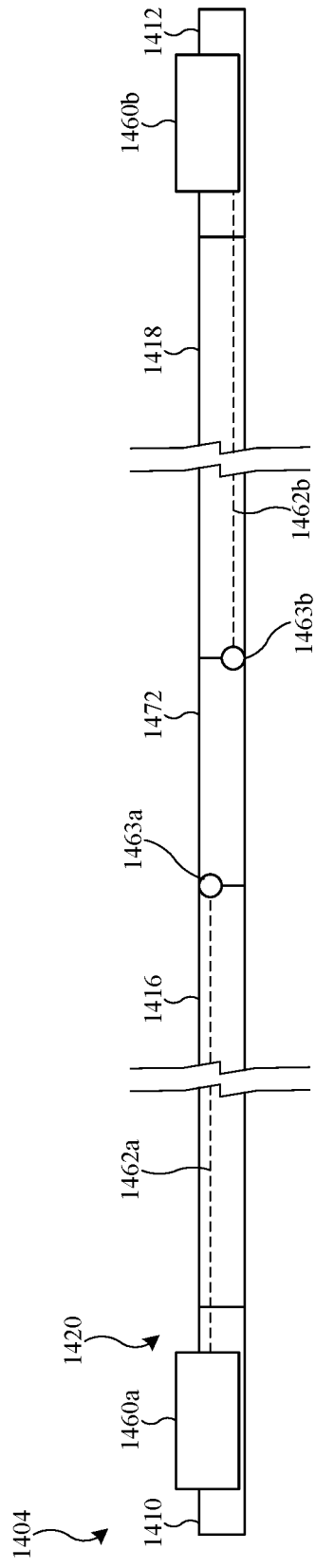
FIG. 14 is a side view illustration of a support band according to a fifth example.
Figure 15:
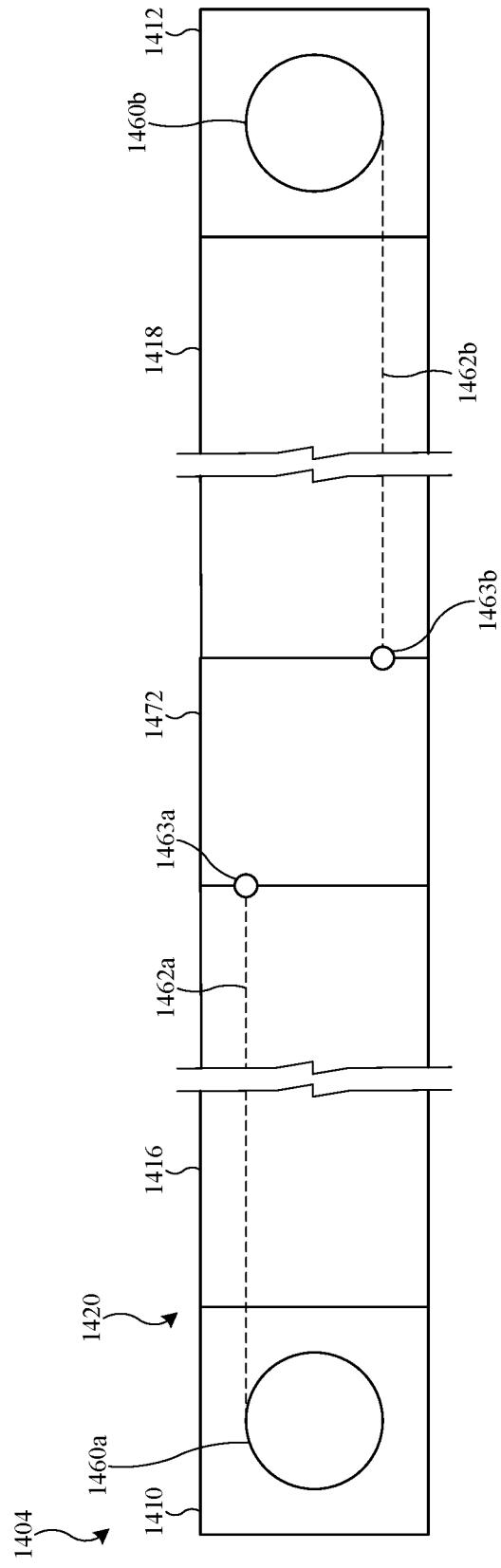
FIG. 15 is a top view illustration of the support band of FIG. 14.

FIG. 14 is a side view illustration of a support band 1404 according to a fifth example. FIG. 15 is a top view illustration of the support band 1404. The support band 1404 is an implementation of the support band 104 of the electronic device 100, and the support band 1404 can be included in the electronic device 100 in place of the support band 104. The description of the electronic device 100 and its components is applicable to the support band 1404 and is incorporated herein. The support band 1404 includes a first end portion 1410, a second end portion 1412, a first band portion 1416, a second band portion 1418, an adjustment assembly 1420, and an intermediate portion 1472. The first end portion 1410 and the second end portion 1412 are equivalent to the first end portion 810 and the second end portion 812 of the support band 804 except as described herein.

The first end portion 1410 and the second end portion 1412 are examples of first and second rigid portions of the support band 1404. It should be understood that the structure of the support band 1404 may be implemented other than extending between end portions.

The first band portion 1416 extends from the first end portion 1410 to the intermediate portion 1472. The second band portion 1418 extends from the second end portion 1412 to the intermediate portion 1472. The intermediate portion 1472 is a structure that is located between the first end portion 1410 and the second end portion 1412 along the longitudinal length of the support band 1404. As an example, the intermediate portion 1472 may be a rigid structure. The first band portion 1416 and the second band portion 1418 of the support band 1404 are otherwise equivalent to the band portion 816 of the support band 804 except as described herein.

The adjustment assembly 1420 includes a first adjustment reel 1460*a*, a second adjustment reel 1460*b*, a first cable 1462*a*, and a second cable 1462*b*. The first adjustment reel 1460*a* and the second adjustment reel 1460*b* are implemented in the manner described with respect to the adjustment reel 860. The first adjustment reel 1460*a* is connected to and located on the first end portion 1410 and is connected to the first cable 1462*a*, which extends from the first adjustment reel 1460*a* to a first connection location 1463*a* where the first cable 1462*a* is connected to the intermediate portion 1472. The second adjustment reel 1460*b* is connected to and located on the second end portion 1412 and is connected to the second cable 1462*b*, which extends from the second adjustment reel 1460*b* to a second connection location 1463*b* where the second cable 1462*b* is connected to the intermediate portion 1472. The first cable 1462*a* and the second cable 1462*b* each extend in a longitudinal direction of the support band 1404.

The user may tighten the support band 1404 using the first adjustment reel 1460*a* and the second adjustment reel 1460*b* as described with respect to the adjustment reel 860. The first adjustment reel 1460*a* and the second adjustment reel 1460*b* are independently operable, allowing the length of the support band 1404 between the first end portion 1410 and the intermediate portion 1472 to be adjusted independent of the length of the support band 1404 between the second end portion 1412 and the intermediate portion 1472.

Figure 16:
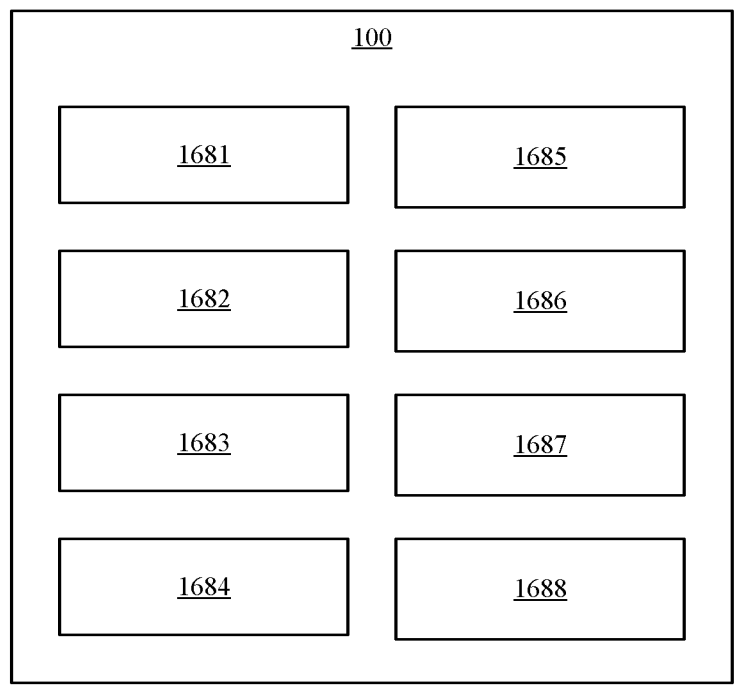
FIG. 16 is a block diagram that shows an example of a hardware configuration that can be used to implement the electronic device.

FIG. 16 is a block diagram that shows an example of a hardware configuration that can be used to implement the electronic device 100. In the illustrated example, the electronic device includes a processor 1681, a memory 1682, a storage device 1683, a communications device 1684, sensors 1685, a power source 1686, a display device 1687, and an optical system 1688.

The processor 1681 is a device that is operable to execute computer program instructions and is operable to perform operations that are described by the computer program instructions. The processor 1681 may be implemented using one or more conventional devices and/or more or more special-purpose devices. As examples, the processor 1681 may be implemented using one or more central processing units, one or more graphics processing units, one or more application specific integrated circuits, and/or one or more field programmable gate arrays. The processor 1681 may be provided with computer-executable instructions that cause the processor 1681 to perform specific functions. The memory 1682 may be one or more volatile, high-speed, short-term information storage devices such as random-access memory modules.

The storage device 1683 is intended to allow for long term storage of computer program instructions and other data. Examples of suitable devices for use as the storage device 1683 include non-volatile information storage devices of various types, such as a flash memory module, a hard drive, or a solid-state drive.

The communications device 1684 supports wired or wireless communications with other devices. Any suitable wired or wireless communications protocol may be used.

The sensors 1685 are components that are incorporated in the electronic device 100 to generate sensor output signals that are used as inputs by the processor 1681 for use in generating CGR content and controlling tension, as will be described herein. The sensors 1685 may include components that facilitate motion tracking. The sensors 1685 may also include additional sensors that are used by the device to generate and/or enhance the user's experience in any way. The sensors 1685 may include conventional components such as cameras, infrared cameras, infrared emitters, depth cameras, structured-light sensing devices, accelerometers, gyroscopes, and magnetometers. The sensors 1685 may also include biometric sensors that are operable to physical or physiological features of a person, for example, for use in user identification and authorization. Biometric sensors may include fingerprint scanners, retinal scanners, and face scanners (e.g., two-dimensional and three-dimensional scanning components operable to obtain image and/or three-dimensional surface representations). Other types of devices can be incorporated in the sensors 1685. The information that is generated by the sensors 1685 is provided to other components of the electronic device, such as the processor 1681, as inputs.

The power source 1686 supplies electrical power to components of the electronic device 100. In some implementations, the power source 1686 is a wired connection to electrical power. In some implementations, the power source 1686 may include a battery of any suitable type, such as a rechargeable battery. In implementations that include a battery, the device may include components that facilitate wired or wireless recharging.

The display device 1687 is connected to the device housing and functions to display content to the user in the form of emitted light that is output by the display device 1687 and is directed toward the user's eyes by the optical system 1688. The display device 1687 is a light-emitting display device, such as a video display of any suitable type, that is able to output images in response to a signal that is received from the processor 1681. The display device 1687 may be of the type that selectively illuminates individual display elements according to a color and intensity in accordance with pixel values from an image. As examples, the display device may be implemented using a liquid-crystal display (LCD) device, a light-emitting diode (LED) display device, a liquid crystal on silicon (LCoS) display device, an organic light-emitting diode (OLED) display device, or any other suitable type of display device. The display device 1687 may include multiple individual display devices.

The optical system 1688 can be utilized in the electronic device 100 to output computer-generated reality content to the user. In some implementations of the electronic device 100, the optical system 1688 is omitted. For example, in implementations in which the electronic device is a smart watch that is configured to be worn on the user's wrist, the optical system 1688 may be omitted.

The optical system 1688 is associated with the display device 1687 and is optically coupled to the display device 1687. The optical system is connected to the device housing such that portions of the optical system 1688 (e.g., lenses) are positioned adjacent to the user's eyes. The optical system 1688 directs the emitted light from the display device 1687 to the user's eyes. In some implementations, the optical system 1688 may be configured to isolate the emitted light from environment light (e.g., as in a virtual reality type system), so that a scene perceived by the user is defined only by the emitted light and not by the environment light. In some implementations, the optical system 1688 may be configured to combine the emitted light with environmental light so that the scene perceived by the user is defined by the emitted light and the environment light. In some implementations, the optical system 1688 may combine the emitted light and the environment light so that a spatial correspondence is established between the emitted light and the environmental light to define the scene that is perceived by the user (e.g., as in an augmented reality type system). The optical system 1688 may include lenses, reflectors, polarizers, filters, optical combiners, and/or other optical components.

In implementations in which the electronic device 100 is a head-mounted computer-generated reality device, it may be configured to be worn on the head of a user and include components that are configured to display content to the user. Components of the electronic device 100 may be configured to track motion of parts of the user's body, such as the user's head and hands. Motion tracking information that is obtained by components of the head-mounted device can be utilized as inputs that control aspects of the generation and display of the content to the user, so that the content displayed to the user can be part of a computer-generated reality experience in which the user is able to view and interact with virtual environments and virtual objects. As will be explained further herein, CGR experiences include display of computer-generated content independent of the surrounding physical environment (e.g., virtual reality), and display of computer generated content that is overlaid relative to the surrounding physical environment (e.g., augmented reality).

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system.

In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create three-dimensional or spatial audio environment that provides the perception of point audio sources in three-dimensional space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

As described above, one aspect of the present technology is operation of an electronic device, which may include the gathering and use of data available from various sources for use by the electronic device. As an example, such data may identify the user and include user-specific settings or preferences. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, a user profile may be established that stores information that allows operation of the electronic device to customized according to the preferences of a user. Accordingly, use of such personal information data enhances the user's experience.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of storing a user profile for customization of operation of an electronic device, the present technology can be configured to allow users to select to "opt in" or "opt out" of participation in the collection of personal information data during registration for services or anytime thereafter. In another example, users can select not to provide data regarding usage of specific applications. In yet another example, users can select to limit the length of time that application usage data is maintained or entirely prohibit the development of an application usage profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, customizations may be made to operation of the electronic device by the user each time the electronic device is used, and without subsequently storing the information or associating the information with the particular user.

What is claimed is:

1. A support band for a wearable electronic device, comprising:
   a first rigid portion;
   a second rigid portion;
   a flexible band portion that extends between the first rigid portion and the second rigid portion;
   a first adjustment reel that is connected to the first rigid portion;
   a first cable that is connected to the first adjustment reel, extends through the flexible band portion from the first adjustment reel to the second rigid portion, and is connected to the second rigid portion, wherein the first adjustment reel is operable to tighten the flexible band portion via the first cable;
   a second adjustment reel that is connected to the second rigid portion; and
   a second cable that is connected to the second adjustment reel, extends through the flexible band portion from the second adjustment reel to the first rigid portion, and is connected to the first rigid portion, wherein the second adjustment reel is operable to tighten the flexible band portion via the second cable.

2. The support band of claim 1, wherein the first adjustment reel is operable to change a length of the first cable that extends between the first adjustment reel and the second rigid portion, and the second adjustment reel is operable to change a length of the second cable that extends between the second adjustment reel and the first rigid portion.

3. The support band of claim 1, wherein the first adjustment reel has an engaged position and a disengaged position, wherein the first cable is movable in a tightening direction in the engaged position and in the disengaged position, the first cable is restrained from moving in a loosening direction in the engaged position, and the first cable is able to move in the loosening direction in the disengaged position.

4. The support band of claim 1, wherein the flexible band portion is elastic.

5. The support band of claim 1, wherein the first cable is directly connected to the second rigid portion and the second cable is directly connected to the first rigid portion.

6. The support band of claim 5, wherein the flexible band portion defines a first passage, the flexible band portion defines a second passage, the first cable extends through the first passage of the flexible band portion to constrain a lateral position of the first cable with respect to the flexible band portion, and the second cable extends through the second passage of the flexible band portion to constrain a lateral position of the second cable with respect to the flexible band portion.

7. The support band of claim 5, wherein the first cable extends along a first longitudinal edge of the flexible band portion and the second cable extends along a second longitudinal edge of the flexible band portion.

8. A support band for a wearable electronic device, comprising:
   a first end portion;
   a second end portion;
   a band portion that extends between the first end portion and the second end portion; and
   an adjustment assembly that includes:
      an adjustment reel that is located on and connected to the first end portion, and
      a cable connected to the first end portion by the adjustment reel and directly connected to the second end portion at a fixed connection location of the second end portion,
      wherein the adjustment assembly is operable to change a length of the cable, via the adjustment reel, between the first end portion and the second end portion to adjust a length of the support band.

9. The support band of claim 8, wherein connection between the cable and the second end portion at the fixed connection location is a non-adjustable connection.

10. The support band of claim 8, wherein the band portion defines an internal space, at least a portion of the adjustment assembly is located in the internal space of the band portion, and the cable extends through the band portion from the first end portion to the second end portion.

11. The support band of claim 8, wherein the first end portion and the second end portion are rigid.

12. The support band of claim 11, wherein the band portion is flexible and elastic, and the band portion is coupled to the first end portion and the second end portion.

13. The support band of claim 8, wherein the adjustment reel has an engaged position and a disengaged position, the cable is movable in a tightening direction in the engaged position, and the cable is restrained from moving in a loosening direction in the engaged position.

14. The support band of claim 13, wherein the cable is free to move in the loosening direction when the adjustment reel is in the disengaged position.

15. The support band of claim 8, wherein the adjustment assembly is operable to change the length of the cable between the first end portion and the second end portion by winding a portion of the cable onto the adjustment reel.

16. The support band of claim 8, wherein the first end portion is configured to be connected to a first side of the wearable electronic device and the second end portion is configured to be connected to a second side of the wearable electronic device.

17. The support band of claim 8, wherein the cable extends through one or more internal spaces defined by the band portion.

18. A support band for a wearable electronic device, comprising:
   a first end portion configured to connect to a first side of the wearable electronic device;
   a second end portion configured to connect to a second side of the wearable electronic device;
   a flexible band portion that extends between the first end portion and the second end portion, the flexible band portion being elastic in a length direction thereof; and
   an adjustment assembly that includes an adjustment reel configured to change a length of a cable that extends through the flexible band portion to allow tightening and loosening of the flexible band portion, wherein the cable includes a first end that is movably connected to the first end portion and a second end that is fixedly connected to the second end portion.

19. The support band of claim 18, wherein the adjustment reel is operable to change the length of the cable that extends through the flexible band portion by winding a portion of the cable onto the adjustment reel.

20. The support band of claim 18, wherein the adjustment reel has an engaged position and a disengaged position, the cable is movable in a tightening direction in the engaged position to tighten the flexible band portion, and the cable is restrained from moving in a loosening direction in the engaged position.

21. The support band of claim 8, wherein the first end portion is a first side portion of the support band and the second end portion is a an opposite second side portion of the support band, and wherein the cable extends between, and is connected to, the first side portion and the opposite second side portion such that the cable is connected at opposite sides of the support band.

22. The support band of claim 18, wherein the adjustment reel is configured to change the length of the cable by moving the first end of the cable with respect to the flexible band portion while the second end of the cable is fixed to the second end portion.

23. The support band of claim 1, wherein the first adjustment reel is operable to wind the first cable onto the first adjustment reel and the second adjustment reel is operable to wind the second cable onto the second adjustment reel to tighten the flexible band portion.

24. The support band of claim 1, wherein the first adjustment reel is operable to extend or retract the first cable and the second adjustment reel is operable to extend or retract the second cable to adjust a length of the flexible band portion.

* * * * *

UNITED STATES PATENT AND TRADEMARK OFFICE
CERTIFICATE OF CORRECTION

| | | |
|---|---|---|
| PATENT NO. | : 12,399,372 B1 | Page 1 of 1 |
| APPLICATION NO. | : 17/236012 | |
| DATED | : August 26, 2025 | |
| INVENTOR(S) | : Zebinah P. Masse et al. | |

It is certified that error appears in the above-identified patent and that said Letters Patent is hereby corrected as shown below:

In the Claims

Column 27, Claim 21, Line 15, "portion is a an opposite" should be --portion is an opposite--.

Signed and Sealed this
Thirtieth Day of September, 2025

John A. Squires
*Director of the United States Patent and Trademark Office*